United States Patent [19]

Shimada et al.

[11] Patent Number: 4,645,334
[45] Date of Patent: Feb. 24, 1987

[54] PRINTING AND TRIMMING APPARATUS

[75] Inventors: Takeo Shimada; Tsutomu Kimura; Ryoichi Hayashi, all of Tokyo, Japan

[73] Assignee: Fuji Photo Film Co., Ltd., Kanagawa, Japan

[21] Appl. No.: 782,249

[22] Filed: Oct. 1, 1985

[30] Foreign Application Priority Data

Oct. 1, 1984 [JP] Japan .................................. 59-205843

[51] Int. Cl.⁴ ............................................. G03B 27/52
[52] U.S. Cl. ........................................ 355/40; 355/54; 355/74
[58] Field of Search ................. 355/40, 46, 54, 73–76, 355/56

[56] References Cited

U.S. PATENT DOCUMENTS 3,813,159  5/1974  Schlegel, Jr. .................... 355/54 X
4,482,924 11/1984  Brownstein ...................... 355/40 X Primary Examiner—Richard A. Wintercorn
Attorney, Agent, or Firm—Sughrue, Mion, Zinn, Macpeak & Seas

[57] ABSTRACT

A printing and trimming apparatus includes a negative film sheet for housing a negative film. The sheet enables trimming information such as the size and position of a trimming frame to be recorded thereon. The trimming information is once stored in a memory means. A control means controls a variable-magnification optical means on the basis of the trimming information read out from the memory means in such a manner that a printing and trimming operation is properly effected.

4 Claims, 9 Drawing Figures

PRINTING AND TRIMMING APPARATUS

BACKGROUND OF THE INVENTION

1. Field of the Invention

The present invention relates a printing and trimming apparatus which enables the image of a negative film frame to be trimmed or cropped as desired when it is printed on a sheet of photographic paper.

2. Description of the Prior Art

When the image of a negative film frame is printed on a sheet of photographic paper, trimming is sometimes effected by varying the degree of magnification. The conventional printing and trimming operation has heretofore been carried out by an operator in a manual operation in which a portion of a sample sheet of photographic paper or a negative film frame is designated as an area which is to be trimmed or cropped and the operator effects a printing and trimming operation while visually checking the designated area.

Accordingly, the conventional printing and trimming operation involves a disadvantageously low working efficiency and an unfavorably high production cost.

SUMMARY OF THE INVENTION

In view of the above-described circumstances, it is a primary object of the present invention to provide a printing and trimming apparatus which enables a highly efficient printing and trimming operation.

To this end, the invention provides a printing and trimming apparatus which has a memory means for storing trimming information recorded on a negative film sheet into which a negative film is inserted, an input means for inputting the trimming information to the memory means, and a variable-magnification optical means for changing the degree of magnification for printing in accordance with the contents stored in the memory means.

By virtue of the above-described arrangement, the degree of magnification of a printing optical means is changed in accordance with the trimming information, whereby it is advantageously possible to effect a highly efficient printing and trimming operation.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and in which.

DESCRIPTION OF THE PREFERRED EMBODIMENTS

Figure 1:
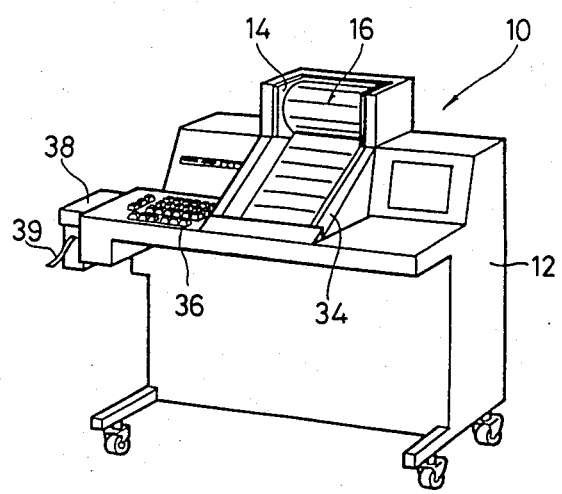
FIG. 1 is a perspective view of an order puncher employed in the printing and trimming apparatus according to a first embodiment of the present invention.

Referring first to FIG. 1, there is shown an order puncher 10 which enables inputting of trimming information. The order puncher 10 is arranged such that a negative film sheet 16 which is wound up on a reel 14 can be mounted on a machine board 12.

Figure 2:
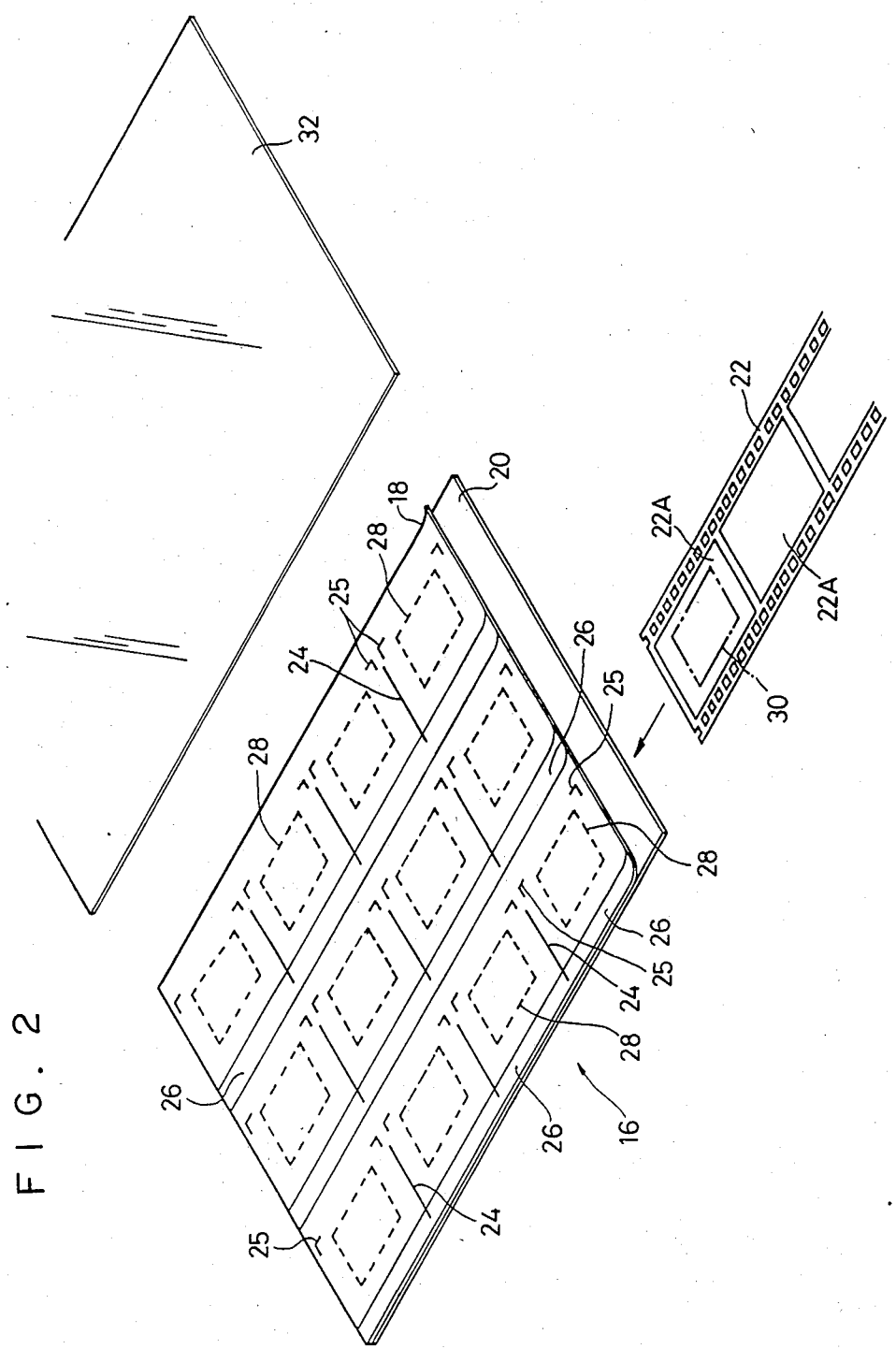
FIG. 2 is an exploded perspective view which shows the relationship between a negative film sheet, a negative film and a sheet base.

Referring to FIG. 2, the negative film sheet 16 is constituted by an obverse sheet member 18 and a reverse sheet member 20 which are bonded together in such a manner that elongated bag-like spaces each of which receives a negative film 22 are defined therebetween.

The obverse sheet member 18 is made of a transparent or translucent material so that it is possible for an operator to visually observe negative films 22 inserted inside the negative film sheet 16. The obverse sheet member 18 is printed with partition lines 24 and hooked frame guide marks 25 in such a manner that they indicate positions corresponding to frames 22A of the negative film 22. The obverse sheet member 18 is further provided with printing information columns 26 in such a manner that they are disposed on one side of each negative film 22 when it is inserted into the negative film sheet 16. Thus, printing information, such as the number of prints to be made for each frame 22A, can be recorded in the corresponding column 26 with a pencil, pen or the like.

The obverse sheet member 18 in accordance with this embodiment is printed with rectangular trimming frames 28 which are formed by dotted lines, each trimming frame 28 being slightly smaller than each of the frames 22A of the negative film 22. The dimensions of the trimming frame 28 are prCeferably selected such that each of the sides of the frame 22A is 1.2 to 1.6 times as large as the corresponding side of the trimming frame 28.

Thus, when the negative film 22 is inserted into the negative film sheet 16 and the corners of each frame 22A are aligned with the corresponding frame guide marks 25, each trimming frame 28 enables the customer, for example when he orders, to know the area of the image of the corresponding frame 22A which is to be trimmed (see an imaginary trimming frame 30 on the negative film 22 shown in FIG. 2). Accordingly, in the state wherein the negative film 22 is inserted into the negative film sheet 16, it is possible to record trimming designating information (e.g., "trimming") in the printing information column 26 if trimming of the image along the trimming frame 28 is desired.

A plurality of negative film sheets 16 are previously bonded to the surface of a continuous and transparent sheet base 32 in another step. The sheet base 32 is wound up on the reel 14, and the negative film sheets 16 are thereby wound up on the reel 14 in series.

The order puncher 10 enables the operator to observe the printing designating columns 26 while unwinding the negative film sheets 16 onto an illuminator 34 and to input the trimming designating information recorded in the columns 26 in addition to printing information such as the number of prints to be made and color compensation information onto a paper tape 39 loaded in a punch section 38 of the order puncher 10 by using input buttons 36.

Figure 3:
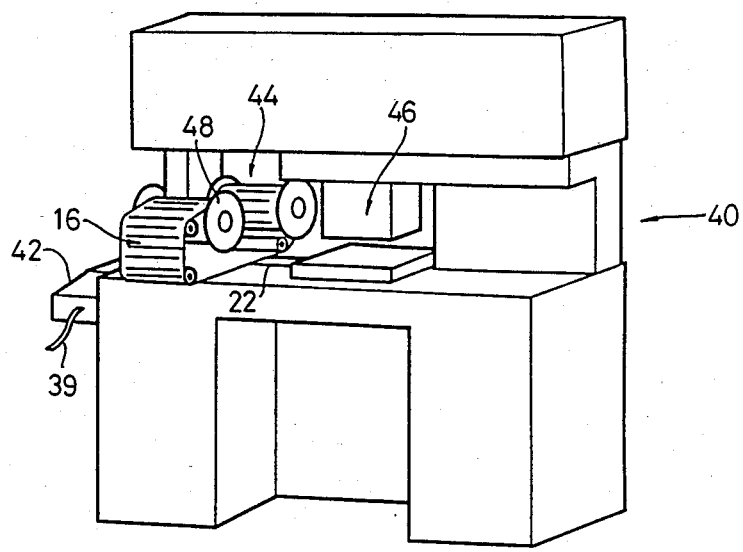
FIG. 3 is a perspective view of a printer.
Figure 4:
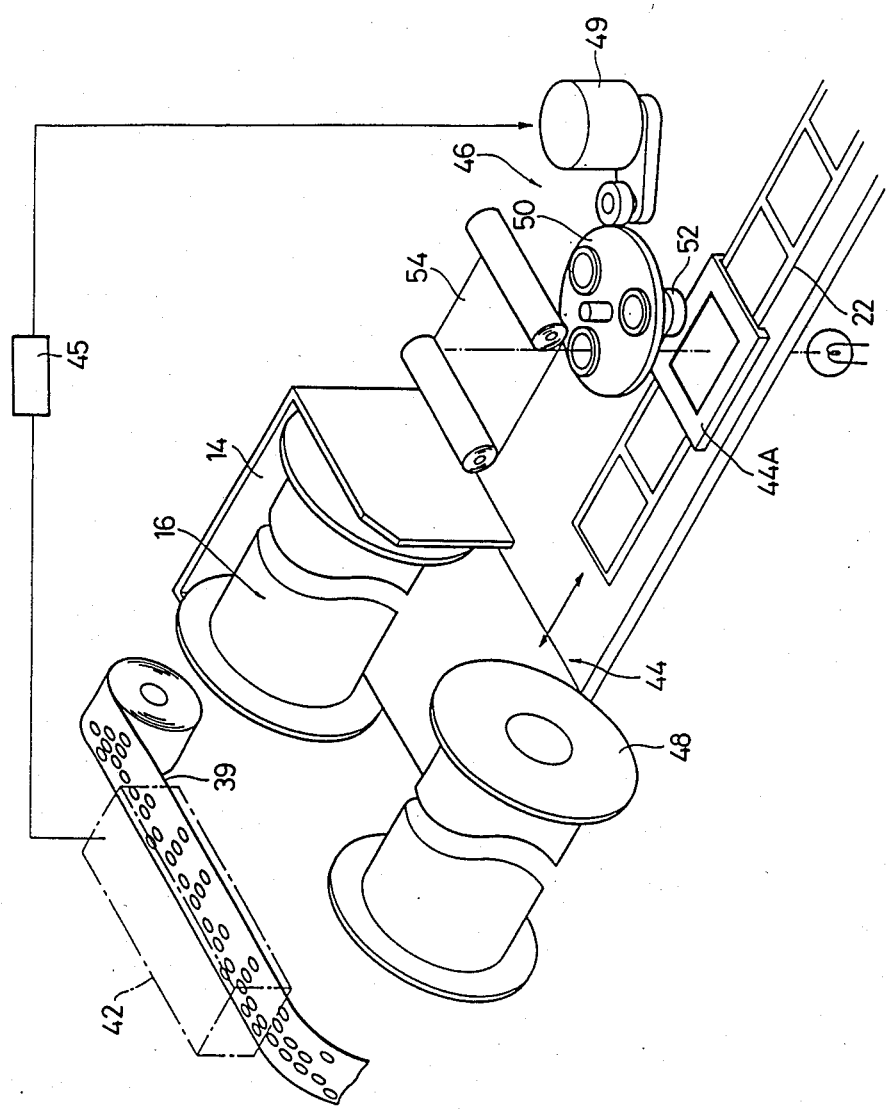
FIG. 4 perspective view of the portion of the printer in the vicinity of its exposure head.

Accordingly, a plurality of negative films 22 and the paper tape 39 in the punch section 38 are synchronized with each other. As shown in FIGS. 3 and 4, the paper tape 39 is loaded on a tape reader 42 of a printer 40, while the roll of negative sheets 16, together with the reel 14, is loaded in a negative film carrier section 44, so that synchronism between the paper tape 39 and the negative films 22 is properly maintained.

In the printer 40, the paper reader 42 reads out the printing information and trimming designating information recorded on the paper tape 39, and the signals thus read out are processed in a controller 45 such as to execute an exposure operation with respect to the negative films 22 which are successively drawn out from the negative film sheets 16 and fed to a negative film carrier body 44A disposed on the optical axis by means of a drive unit (not shown) which is provided on an exposure head 46. After being subjected to exposure, the negative films 22 are successively inserted into the negative film sheets 16 again and wound up on a takeup reel 48.

In the exposure head 46, printing conditions are changed on the basis of the printing information read out, such as the number of prints to be made and the printing compensation information. In addition, the controller 45 causes a motor 49 to rotate a turntable 50 on the basis of the trimming designating information read. The turntable 50 has a plurality of exposure lenses 52 and is arranged such that, when a particular frame 22A of a negative film 22 which is to be trimmed is fed to the carrier body 44A, it is possible for an exposure lens 52 for trimming to be disposed on the optical axis so as to print trimmed image on a sheet of photographic paper 54.

The following is a description of the operation of the above-described embodiment.

A person who places an order for prints records the number of prints to be made for each negative frame 22A in the associated printing information column 26. In addition, the customer aligns the corners of the frame 22A with the frame guide marks 25 printed on the negative film sheet 16, and if a picture which is desired to be trimmed is within the trimming frame 28, he records trimming designating information in the column 26 and then places an order for a print.

A printing operator inserts these negative films 22 received from the customers into a plurality of negative film sheets 16 and bonds them to a sheet base 32 to form a continuous negative film sheet assembly. The operator unwinds the negative film sheets 16 together with the sheet base 32 from the reel 14 and passes them on the illuminator 34 and, while doing so, he inputs the trimming designating information in addition to the printing information onto the paper tape 39 at the punch section 38.

The paper tape 39 having the information input thereto and the negative film sheets 16 are loaded on the printer 40. At the negative film carrier section 44, the negative films 22 are successively drawn out from the negative film sheets 16 unwound from the reel 14 and are fed to the exposure head 46 so as to be disposed on the optical axis. In the exposure head 46, the printing conditions are changed on the basis of the stored printing information. When trimming designating information is available, the turntable 50 is rotated in such a manner that an exposure lens 52 which has a relatively large magnifying power is disposed on the optical axis. In consequence, a trimmed image is printed on the photographic paper 54. The negative films 22 which have been subjected to exposure are returned to the negative film sheets 16 and are wound up on the takeup reel 48.

Figure 5:
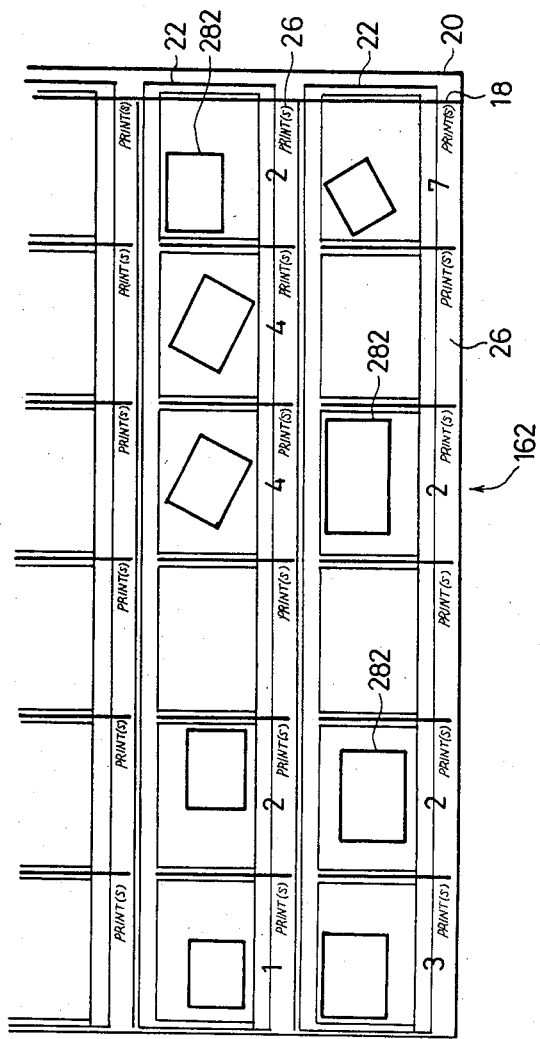
FIGS. 5 to 8 are front elevational views of negative film sheets which are respectively employed in a second through a fifth embodiment of the present invention.

Referring next to FIG. 5, there is shown a negative film sheet 162 which is employed in a second embodiment of the present invention. This negative film sheet 162 differs from that of the first embodiment in that each trimming frame 282 is drawn by each individual customer to a desired size and at a desired angle of inclination by employing a pen or the like. Unlike the first embodiment, therefore, it is possible according to the second embodiment to effect a trimming of any desired size and at any desired angle.

To realize the above-described type of trimming, it is necessary to input various signals to a memory device, such as an X-Y value signal for correcting the amount of offset of the center of the image created by a particular trimming frame 282 from the center of the image representing the entirety of the corresponding negative film frame, a signal which represents the appropriate degree of magnification relative to the size of the image created by the trimming frame 282, and a signal which indicates the angle of inclination of the trimming frame 282.

These signals may be manually input by the operator by employing the order puncher 10 of the first embodiment. Alternatively, the arrangement may be such that the image of a negative film frame is projected by the use of a viewer which is able to vary the projection position, magnification and angle in relation to the negative film 22 and when a position, magnification and angle which are most suitable for the trimming frame 282 are obtained, these optimal values are stored in the memory device by means of a manual or automatic operation.

The information thus input to the memory device is read out by employing the tape reader 42 of the printer 40 of the first embodiment, and the controller 45 controls the exposure head 46 and the negative film carrier section 44 on the basis of the information read out. In such a case, the additional requirement is to provide an alignment means and an angle changing means. The alignment means moves the negative film 22 relative to the negative film carrier body 44A in accordance with the X-Y value signal and aligns the respective centers of the trimming frame 282 and the photographic paper 54 with the optical axis of light for printing, while the angle changing means aligns the respective axes of the trimming frame 282 and the photographic paper 54 by, for example, rotating the negative film 22 in accordance with the angle signal in relation to the particular trimming frame 282.

Further, the size of an exposure mask may be automatically changed in accordance with a selected degree of magnification for trimming.

Figure 6:
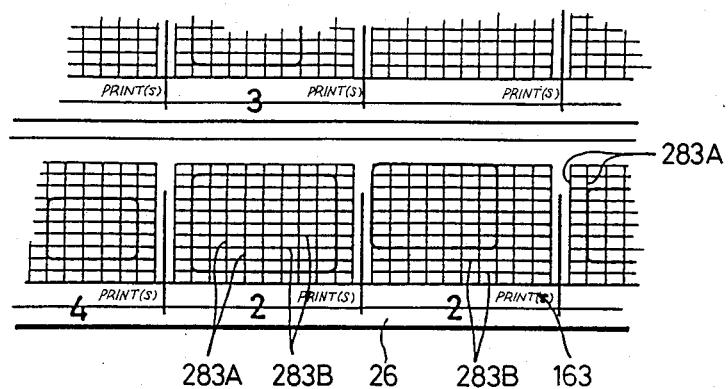

FIG. 6 shows a negative film sheet 163 which is employed in a third embodiment of the present invention. This negative film sheet 163 is previously printed with a grid of vertical thin lines 283A and horizontal thin lines 283B spaced at predetermined intervals. Thus, it is possible for a customer to designate a trimming frame by drawing a thick line along selected lines of the grid by which a desired cropped image is defined. This trimming frame can be read in a manner similar to that explained for the above-described embodiment.

Figure 7:
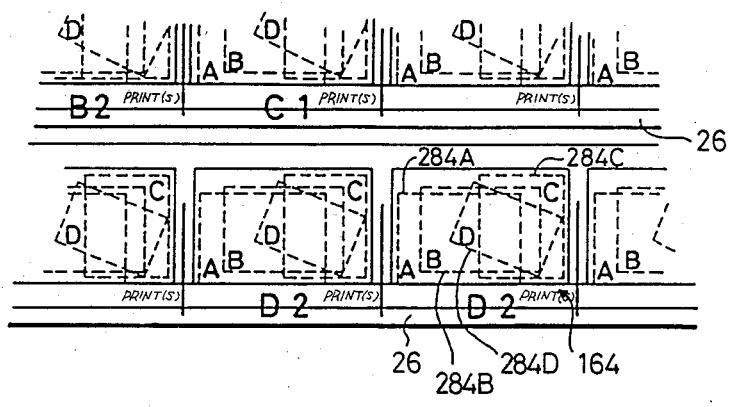

Referring next to FIG. 7, there is shown a negative film sheet 164 which is employed in a fourth embodiment of the present invention. This negative film sheet 164 is previously printed with trimming frames 284A, 284B, 284C and 284D by, for example, thin or dotted lines, these trimming frames having different sizes and being set at different angles. Accordingly, it is possible for a customer to select a desired trimming frame and to write a mark or sign representing the selected frame in the printing information column 26.

In this case, the trimming designating information may be handled in a manner similar to that in each of the above-described embodiments.

Figure 8:
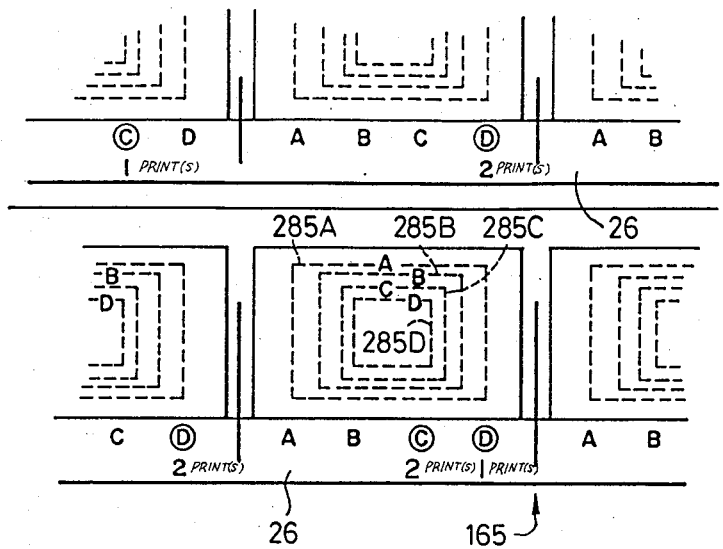

FIG. 8 shows a negative film sheet 165 which is employed in a fifth embodiment of the present invention. This negative film sheet 165 is previously printed with trimming frames 285A, 285B, 285C and 285D of differing sizes with a common center point, indicated by dotted lines or the like, thereby allowing a customer to select a trimming frame of a desired size. The printing information column 26 is previously printed with symbols A, B, C and D which correspond to the respective trimming frames. Accordingly, it is only necessary for a customer to circle any one of the marks A, B, C and D in accordance with the selected trimming frame and to write the desired number of prints under the circled mark.

Figure 9:
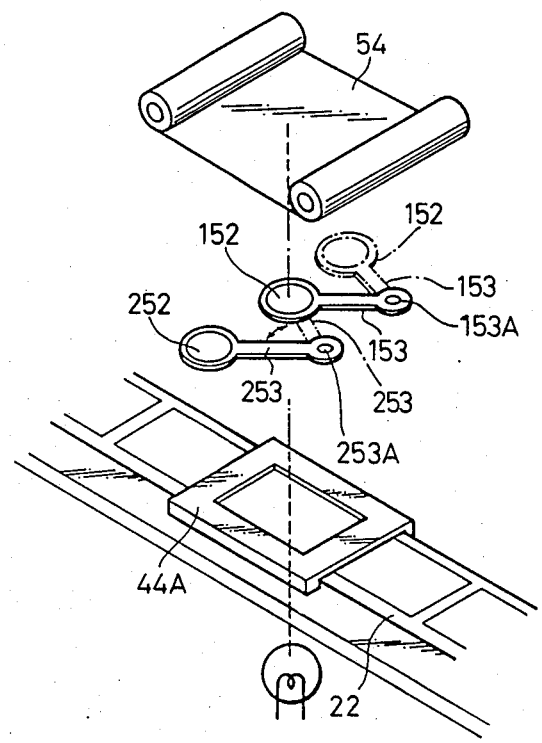
FIG. 9 is a perspective view of a structure for changing exposure lenses which is employed in a sixth embodiment of the present invention.

FIG. 9 shows an exposure lens changing structure for the exposure head which is employed in a sixth embodiment of the present invention. In this embodiment, a plurality of exposure lenses 152 and 252 are respectively mounted on the distal ends of arms 153 and 253. The proximal ends of the arms 153 and 253 are pivotally supported by respective pins 153A and 253A. Accordingly, by pivoting the arms 153 and 253 about the respective pins 153A and 253A, it is possible for the exposure lenses 152 and 252 to be selectively disposed on the optical axis so as to cope with the need for various kinds of trimming. It is, as a matter of course, possible to employ a zoom lens or an attachment lens as the variable-magnification optical means, although neither of these lenses is illustrated.

It is to be noted that, although printing information and trimming designating information are stored in the memory device which employs the paper tape in the above-described embodiments, other types of memory means may also be employed for storing information, such as magnetic memory means, e.g., a magnetic tape, a magnetic disk and so forth.

As has been described above, the present invention provides a printing and trimming apparatus which enables the images of a negative film to be printed on photographic paper with a range of degrees of magnification, the apparatus having a memory means which stores trimming information recorded on a negative film sheet into which a negative film is inserted, an input means which inputs the trimming information to the memory means, and a variable-magnificatior optical means for changing the degree of magnification for printing in accordance with the contents stored in the memory means. It is therefore advantageously possible to effect a highly efficient printing and trimming operation.

What is claimed is:

1. A printing and trimming apparatus which enables the images of a negative film to be printed on photographic paper with a range of degrees of magnification, said apparatus comprising:
    (a) trimming information memory means which stores an X-Y value signal for correcting the amount of offset of the center of a trimming designated image area on a negative film from the center of an image frame, a magnification signal which represents the appropriate degree of magnification relative to the size of the trimming designated image area, and an angle signal which represents an angle corresponding to the configuration of the trimming designated image area;
    (b) means for reading out the trimming information from said memory means;
    (c) variable-magnification optical means for changing the degree of magnification for printing;
    (d) positional alignment means which moves the respective positions of an image frame and the photographic paper relative to each other in accordance with the X-Y value signal among said trimming information read out from said memory means so that the respective centers of the trimming designated image area and the photographic paper are aligned with the axis of the optical path of light for printing;
    (e) optical means changing means which changes the degree of magnification for printing in accordance with the magnification signal among said trimming information read out from said memory means; and
    (f) angle changing means which aligns the respective axes of the trimming designated image area and the photographic paper in accordance with the angle signal among said trimming information read out from said memory means.

2. A printing and trimming apparatus according to claim 1, wherein said trimming information includes a trimming frame of a predetermined size which is previously printed on a negative film sheet into which a negative film is inserted and trimming designating information which represents that a negative film frame corresponding to said trimming frame of said negative film sheet should be trimmed or cropped when it is printed.

3. A printing and trimming apparatus according to claim 2, wherein a plurality of said negative film sheets are bonded to a single sheet base, which is wound up in the shape of a roll and supplied to input means for inputting the trimming information to said memory means and to a printer which effects printing on the photographic paper.

4. A printing and trimming apparatus according to claim 1, wherein said memory means is a paper tape, and said trimming information is input to said paper tape by a puncher.

* * * * *